United States Patent [19]

Schierling

[11] Patent Number: 5,765,674
[45] Date of Patent: Jun. 16, 1998

[54] MEMBRANE SPRING CLUTCH FOR A MOTOR VEHICLE

[75] Inventor: Bernhard Schierling, Kürnach, Germany

[73] Assignee: Fichtel & Sachs AG, Schweinfurt, Germany

[21] Appl. No.: 625,759

[22] Filed: Mar. 29, 1996

[30] Foreign Application Priority Data

Mar. 31, 1995 [DE] Germany ............... 195 11 967.3

[51] Int. Cl.[6] .................................................. F16D 13/71
[52] U.S. Cl. .................................. 192/89.23; 192/113.4
[58] Field of Search ........................... 192/70.12, 89.22, 192/89.23, 89.24, 113.4, 70.27

[56] References Cited

U.S. PATENT DOCUMENTS

| | | | |
|---|---|---|---|
| 1,717,534 | 6/1929 | Wemp | 192/113.4 X |
| 2,002,943 | 5/1935 | Hartley | 192/113.4 X |
| 2,190,874 | 2/1940 | Jarrett | 192/113.4 |
| 4,667,794 | 5/1987 | Martinez-Corral et al. | |

FOREIGN PATENT DOCUMENTS

| | | | |
|---|---|---|---|
| 0227208 | 7/1987 | European Pat. Off. | |
| 0235882 | 9/1987 | European Pat. Off. | |
| 0249469 | 12/1987 | European Pat. Off. | |
| 0271382 | 6/1988 | European Pat. Off. | |
| 2222570 | 10/1974 | France | |
| 2546999 | 12/1984 | France | |
| 2586277 | 2/1987 | France | |
| 1450201 | 8/1969 | Germany | |
| 2 205 454 | 8/1973 | Germany | 192/113.4 |
| 2853298 | 6/1980 | Germany | |
| 3419235 | 11/1984 | Germany | |
| 3441504 | 5/1986 | Germany | |
| 3940957 | 7/1990 | Germany | |
| 4013186 | 10/1990 | Germany | |
| 4311286 | 10/1993 | Germany | |
| 4326404 | 2/1994 | Germany | |
| 515432 | 1/1976 | Japan | |
| 55-145726 | 10/1980 | Japan | |
| 5730499 | 7/1982 | Japan | |
| 60-53224 | 3/1985 | Japan | 192/113.4 |
| 64729 | 1/1989 | Japan | |
| 269127 | 5/1990 | Japan | |
| 6202515 | 7/1994 | Japan | |
| 1432739 | 4/1976 | United Kingdom | |
| 2094420 | 9/1982 | United Kingdom | |
| 2142403 | 1/1985 | United Kingdom | |
| 2144813 | 3/1985 | United Kingdom | |

*Primary Examiner*—Rodney H. Bonck
*Attorney, Agent, or Firm*—Nils H. Ljungman and Associates

[57] ABSTRACT

A membrane spring clutch, in particular for motor vehicles, includes a clutch housing, a pressure plate for the transmission of the application pressure to friction linings and a membrane spring. In the area between the membrane spring and the pressure plate there is located an insulating member. The insulating member minimizes heat conduction from the pressure plate to the membrane spring to minimize distortion of the membrane spring from thermal conduction of heat from the pressure plate to the membrane spring.

4 Claims, 3 Drawing Sheets

5,765,674

MEMBRANE SPRING CLUTCH FOR A MOTOR VEHICLE

BACKGROUND OF THE INVENTION

1. Field of the Invention:

The present invention generally relates to a membrane spring clutch, in particular for motor vehicles, with a clutch housing, an application plate to transmit the application pressure to friction linings, and a membrane spring.

2. Background Information:

German Laid Open Patent Application No. 34 41 504 discloses membrane spring clutches in which the membrane springs are held in their position with respect to the clutch housing and supported with respect to the clutch housing. Such membrane spring clutches can be used in motor vehicles, and it is essentially irrelevant whether these membrane spring clutches are used in a flywheel with two centrifugal masses or in a self-adjusting clutch.

But one disadvantageous feature of known clutches, such as described hereinabove, is that severe heating can occur on the application edge, which heating in turn can have a negative impact on the membrane spring. In an extreme case, a deformation of the membrane spring could occur at this point, resulting in a reduction of the efficiency of the clutch.

Because the space available for the installation of these clutches continues to decrease, it is essentially becoming increasingly necessary to reduce the axial length of the application plate edge and even to reduce the height of the centrifugal mass itself. As a result, increases can generally occur in the temperature level of the application plate edge.

OBJECT OF THE INVENTION

An object of the present invention is to create a membrane spring clutch which can be used in flywheels having two centrifugal masses and/or in self-adjusting clutches, in which the thermal load which occurs on the application edge is reduced, so that a disadvantageous effect on the membrane spring is essentially prevented.

SUMMARY OF THE INVENTION

At least one preferred embodiment of the present invention teaches that this object, as described immediately hereinabove, can be achieved if there are means to reduce the transmission of heat in the area between the membrane spring and the application plate. It is thereby advantageous that there is neither a negative effect on the application edge, nor a negative impact on the membrane spring itself.

In an additional embodiment of the present invention, the means to reduce the transmission of heat are provided in the form of thermal insulation.

In one favorable embodiment of the present invention, between the application plate and the membrane spring, there is a material pairing which essentially prevents thermal transmission.

In an additional embodiment of the present invention, the means to reduce the transmission of heat are distributed over part of the periphery (of at least one of the membrane spring and the application plate), and in general, the contact surfaces are essentially reduced to the minimum absolutely necessary.

In an additional embodiment of the present invention, thermal flux is conducted away from the area between the application plate and the membrane spring.

In one embodiment of the present invention, which embodiment is simple in terms of the manufacturing technology involved, the membrane spring is provided with a protective device.

In another embodiment of the present invention, the transmission of heat from the application plate to the membrane spring can also be prevented if the means are the minimization of the contact surfaces.

In another advantageous embodiment of the present invention, the means to reduce the transmission of heat are an increase in the thickness of the material and/or the addition of reinforcement ribs.

When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

One aspect of the present invention resides broadly in a friction clutch for a motor vehicle, the friction clutch comprising: a clutch housing; a clutch disc for being disposed on a transmission input shaft having a longitudinal axis, the clutch disc being axially movable along the transmission input shaft; pressure plate means for engaging and disengaging the clutch disc with a flywheel, the pressure plate means being axially movable along the transmission input shaft; the clutch disc comprising: friction lining means disposed between the pressure plate means and the flywheel for contacting the flywheel and the pressure plate means upon engagement of the clutch disc; membrane spring means disposed between the clutch housing and the pressure plate means for applying pressure to the pressure plate means and for biasing the pressure plate means towards the flywheel; means for reducing heat transmission between an area of the pressure plate means adjacent the friction lining means and the membrane spring means; and the means for reducing heat transmission being disposed between the area of the pressure plate means adjacent the friction lining means and a substantial portion of the membrane spring means.

Another aspect of the present invention resides broadly in a friction clutch for a motor vehicle, the friction clutch comprising: a clutch housing; a clutch disc for being disposed on a transmission input shaft having a longitudinal axis, the clutch disc being axially movable along the transmission input shaft; pressure plate means for engaging and disengaging the clutch disc with a flywheel, the pressure plate means being axially movable along the transmission input shaft; the clutch disc comprising: friction lining means disposed between the pressure plate means and the flywheel for contacting the flywheel and the pressure plate means upon engagement of the clutch disc; membrane spring means disposed between the clutch housing and the pressure plate means for applying pressure to the pressure plate means and for biasing the pressure plate means towards the flywheel; means for reducing heat transmission between an area of the pressure plate means adjacent the friction lining means and the membrane spring means; the means for reducing heat transmission being disposed between the area of the pressure plate means adjacent the friction lining means and a substantial portion of the membrane spring means; the pressure plate means has an axis of rotation; the membrane spring means has an axis of rotation being coaxial with the pressure plate means; the pressure plate means comprises an inner portion and an outer portion, the outer portion of the pressure plate means being disposed radially farther from the axis of rotation than the inner portion of the pressure plate means, with respect to the axis of rotation; the pressure plate means comprises a first side and a second side; the second side of the pressure plate means comprises a first contact surface; the membrane spring means comprises an inner portion and an outer portion, the outer portion of the membrane spring means being disposed radially farther from the axis of rotation than the inner portion of the membrane spring means, with respect to the axis of rotation; the membrane spring means comprises a first side and a second side; the second side of the membrane spring means comprises a second contact surface; the second side of the pressure plate means and the second side of the membrane spring means being disposed substantially opposite one another with respect to one another and facing substantially towards one another; the means for reducing heat transmission is disposed circumferentially about at least a portion of the outer portion of at least one of:

a) the pressure plate means; and
b) the membrane spring means;

the friction clutch including: means for conducting thermal flux; the means for conducting thermal flux is disposed in the area of the pressure plate means adjacent the friction lining means and the membrane spring means; the means for reducing heat transmission comprises a contact surface; the contact surface comprises means for providing minimal contact between the first contact surface and the second contact surface upon contact of the first contact surface with the second contact surface; at least one of:

a) the pressure plate means and
b) the membrane spring means comprises at least one reinforcing rib; the means for reducing heat transmission comprises at least one of:

a) an additional thickness on the pressure plate means; and
b) the at least one reinforcement rib;

the first contact surface comprises a device for thermally protecting the membrane spring means; the means for reducing heat transmission comprises at least one of:

a) a metal material; and
b) a plastic material;

the plastic material being substantially heat resistant; the metal material having a first thermal resistance; the pressure plate means having a second thermal resistance; the membrane spring means having a third thermal resistance; the first thermal resistance being greater than at least one of:

a) the second thermal resistance; and
b) the third thermal resistance; and the means for reducing heat transmission comprises at least one of:

a) a first insulating material; and
b) a second insulating material.

BRIEF DESCRIPTION OF THE DRAWINGS

The present invention is explained in greater detail below with reference to various embodiments which are illustrated in the accompanying drawings, in which.

DESCRIPTION OF THE PREFERRED EMBODIMENT

Figure 1:
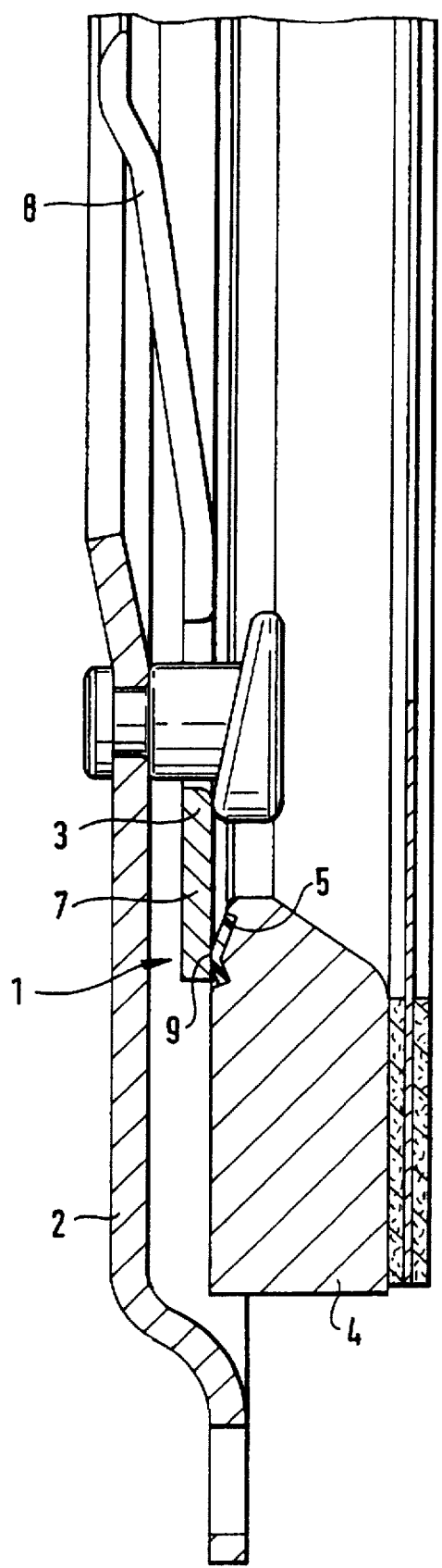
FIG. 1 shows a section through a membrane spring in the vicinity of the radially outside contact surface of the membrane spring.

The membrane spring clutch illustrated in FIG. 1 can essentially include an application plate 4, a clutch housing 2, and a membrane spring 3, which membrane spring 3 is located between the clutch housing 2 and the application plate 4. The membrane spring 3 preferably includes a radially outer ring-shaped body 7, from which outer ring-shaped body 7 flexible tabs 8 extend, pointing radially inwardly.

In the vicinity of the ring-shaped body 7 of the membrane spring 3 and the application plate 4, there are means 1 which can reduce, or essentially even prevent, the transmission of heat from the application edge 9 to the membrane spring 3. The means 1 to reduce thermal transmission can be insulation 5, which insulation 5 can be located so as to extend uniformly along the periphery of the application edge 9, or which insulation 5 is provided only over part of the periphery of the application plate 4.

Figure 2:
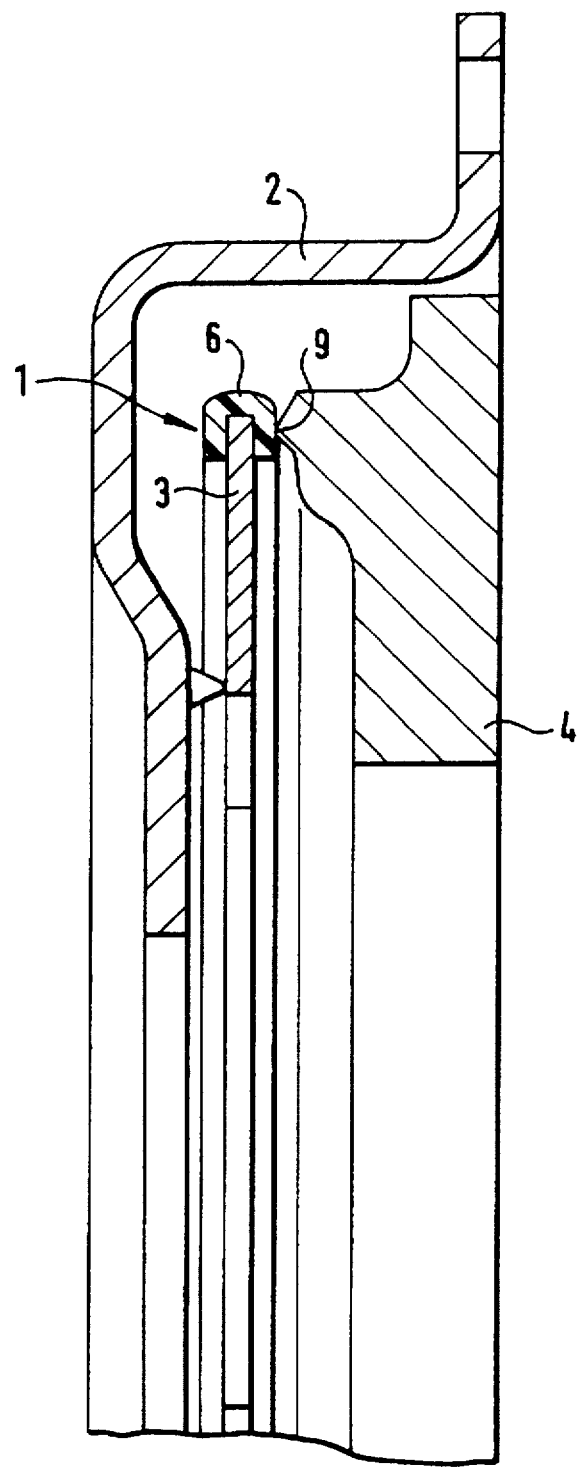
FIG. 2 illustrates an additional embodiment of a membrane spring clutch in which the membrane spring is provided with a protective device.

FIG. 2 shows an additional embodiment of the present invention in which the means 1 can be a protective device 6, which protective device 6 is located in the vicinity of the application edge 9 and the membrane spring 3. This protective device 6 can also prevent the flow of heat from the application plate 4 to the membrane spring 3 in the event of an extreme load on the clutch, so that there is essentially no abnormal load on the material of the membrane spring 3 in this embodiment, either.

In accordance with one embodiment of the present invention, the protective device 6 can preferably surround at least the end of the membrane spring 3. Thus, the membrane spring 3 can contact the application plate 4 essentially indirectly via the protective device 6.

Figure 3:
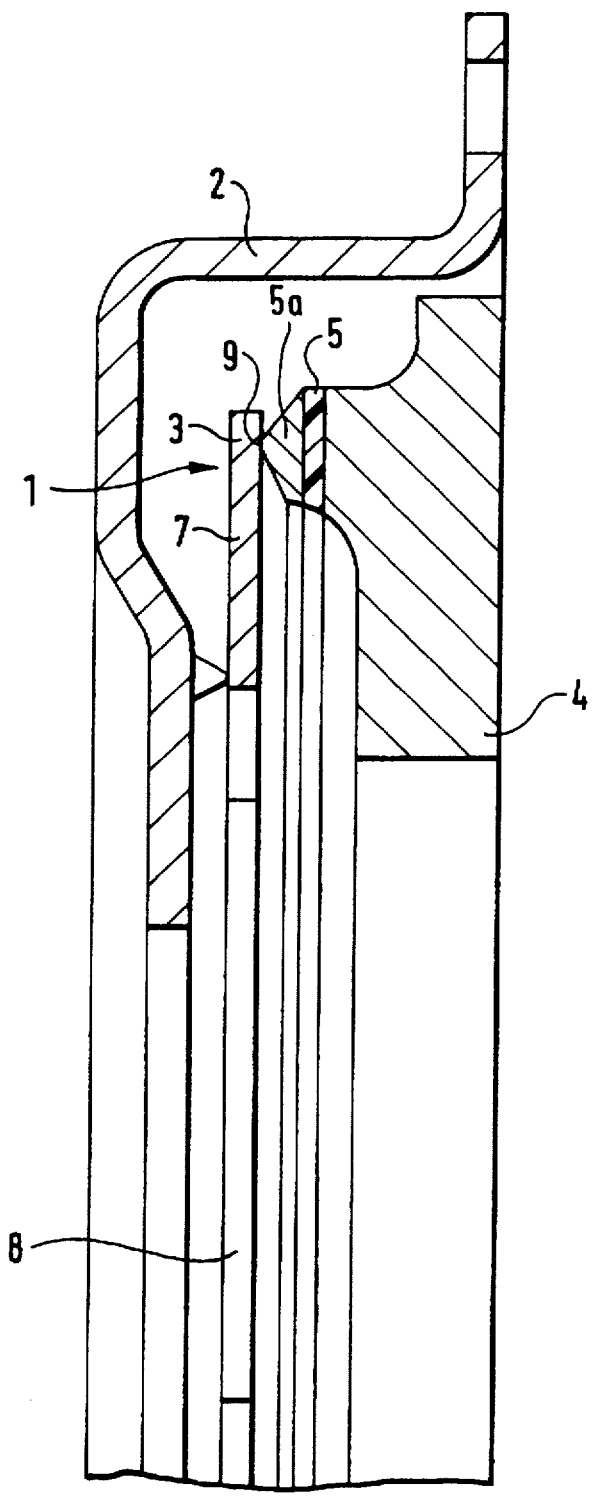
FIG. 3 illustrates an additional embodiment of a membrane spring clutch with additional variants of the insulation.

FIG. 3 shows an additional embodiment of the present invention wherein the insulation 5 can preferably be located in the vicinity of the application plate 4, and the flow of heat between the application edge 9 and the application plate 4 can be interrupted by an intermediate layer 5a. The intermediate layer 5a can be a material having a higher resistance to thermal conductivity than the adjacent application plate 4.

In accordance with at least one embodiment of the present invention, the insulation, as described hereinabove, could be a composite of heat resistant fibers, and the composite can preferably be adhered to the application plate 4 by means of an epoxy. This combination of adhesive and insulation can also be used as a protective device, as described hereinabove with reference to FIG. 2, located in the vicinity of the application edge 9 (between the application plate 4 and the membrane spring 3), and can also essentially prevent the flow of heat from the application plate 4 to the membrane spring 3.

In accordance with at least one embodiment of the present invention, insulation materials can also be a forsterite composition, Teflon, compositions of ceramic fibers and binders, Kapton, and epoxy resin compositions. Adhesives which may be used can be high-strength tape, cyanoacrylate formulations, carborane siloxane polymers, and various copolymer compositions.

One feature of the invention resides broadly in the membrane spring clutch, in particular for motor vehicles, with a clutch housing, an application plate for the transmission of the application pressure to the friction lining, and a membrane spring, characterized by the fact that in the area between the membrane spring 3 and the application plate 4 there are means 1 to reduce the transmission of heat.

Another feature of the invention resides broadly in the membrane spring clutch characterized by the fact that insulation 5 is provided as the means 1.

Yet another feature of the invention resides broadly in the membrane spring clutch characterized by the fact that between the application plate 4 and the membrane spring 3, there is a material pair which prevents the transmission of heat.

Still another feature of the invention resides broadly in the membrane spring clutch characterized by the fact that the means 1 are located distributed around part of the periphery.

A further feature of the invention resides broadly in the membrane spring clutch characterized by the fact that the thermal flux is conducted away from the area between the application plate 4 and the membrane spring 3.

Another feature of the invention resides broadly in the membrane spring clutch characterized by the fact that the membrane spring 3 is provided with a protective device 6.

Yet another feature of the invention resides broadly in the membrane spring clutch characterized by the fact that the means 1 are the minimization of the contact surfaces.

Still another feature of the invention resides broadly in the membrane spring clutch characterized by the fact that the means 1 are an increase in the thickness of the material and/or the introduction of reinforcement ribs.

A further feature of the invention resides broadly in the membrane spring clutch characterized by the fact that the contact surface of the application plate edge 9 is provided with a protective device.

Another feature of the invention resides broadly in the membrane spring clutch characterized by the fact that the means 1 consist of metal materials which have a significantly higher resistance to thermal conductivity than the application plate 4 and/or the membrane spring 3.

Yet another feature of the invention resides broadly in the membrane spring clutch characterized by the fact that the means 1 consist of plastic which is resistant to high temperatures.

Examples of clutches may be found in the following documents; U.S. patent application Ser. No. 08/221372 filed on Mar. 31, 1994 entitled "FLYWHEEL & CLUTCH SYSTEM", having inventors Bernhard SCHIERLING and Hilmar GOBEL, issued as U.S. Pat. No. 5476166 on Dec. 19, 1995, which corresponds to Federal Republic of Germany patent application No. P 43 11 102, filed on Apr. 3, 1993, which corresponds to DE-OS 43 11 102 and DE-PS 43 11 102; U.S. patent application Ser. No. 08/360455 filed on Dec. 21, 1994 entitled "FRICTION CLUTCH FOR A MOTOR VEHICLE", having inventor Harald JEPPE, which corresponds to Federal Republic of Germany patent application No. P 43 44 124, filed on Dec. 23, 1993, which corresponds to DE-OS 43 44 124 and DE-PS 43 44 124; U.S. patent application Ser. No. 08/405139 filed on Mar. 16, 1995 entitled "A MOTOR VEHICLE MANUAL TRANSMISSION WITH A CLUTCH WHICH CLUTCH HAS A FASTENING STRUCTURE FOR FASTENING THE LINING SPRING SEGMENTS TO THE DRIVING PLATE", having inventors Jens SCHNEIDER and Harald JEPPE, which corresponds to Federal Republic of Germany patent application No. P 44 09 253, filed on Mar. 18, 1994, which corresponds to DE-OS 44 09 253 and DE-PS 44 09 253; U.S. patent application Ser. No. 08/438709 filed on May 11, 1995 entitled "CLUTCH ASSEMBLY FOR A MOTOR VEHICLE HAVING A FLEXIBLE CLUTCH DISC", having inventors Joachim LINDNER, Jorg SUDAU, and Bernhard SCHIERLING, which corresponds to Federal Republic of Germany patent application No. P 44 16 949, filed on May 13, 1994, which corresponds to DG-OS 44 16 949 and DE-PS 44 16 949; U.S. patent application Ser. No. 08/499305 filed on Jul. 7, 1995 entitled "CLUTCH DISC OF A MOTOR VEHICLE, WHICH CLUTCH DISC HAS AN ELASTIC CONNECTION BETWEEN THE CARRIER PLATE & HUB", having inventors Klaus MEMMEL, Gunter WAWRZXK, Winfried STURMER, and Harald JEPPE, which corresponds to Federal Republic of Germany patent application No. P 44 24 186, filed on Jul. 8, 1994, which corresponds to DE-OS 44 24 186 and DE-PS 44 24 186; U.S. patent application Ser. No. 08/502401 filed on Jul. 14, 1995 entitled "A TRANSMISSION OF AN INTERNAL COMBUSTION ENGINE WITH A CLUTCH WITH A TWO-MASS FLYWHEEL", having inventors Michael WEISS, Jorg SUDAU, Bernhard SCHIERLING, Thomas WIRTH, Jurgen KLEIFGES, Reinhard FELDEAUS, Andreas ORLAMUNDER, and Eberhard KNAUPP, which corresponds to Federal Republic of Germany patent application No. P 195 19 363, filed on May 26, 1995, which corresponds to DE-OS 195 19 363 and DE-PS 195 19 363; U.S. patent application Ser. No. 08/504848 filed on Jul. 20, 1995 entitled "AIR-COOLED FLYWHEEL & A FRICTION CLUTCH FOR A TRANSMISSION OF A MOTOR VEHICLE, THE FLYWHEEL HAVING TWO CENTRIFUGAL MASSES", having inventors Bernhard SCHIERLING, Rudolf BAUERLEIN, Cora CARLSON, and Hilmar GOBEL, which corresponds to Federal Republic of Germany patent application No. P 44 25 570, filed on Jul. 20, 1994, which corresponds to DE-OS 44 25 570 and DE-PS 44 25 570; U.S. patent application Ser. No. 08/515263 filed on Aug. 15, 1995 entitled "A FLYWHEEL FOR THE FRICTION CLUTCH OF A MOTOR VEHICLE, THE FLYWHEEL HAVING TWO CENTRIFUGAL MASSES & A FRICTION DEVICE", having inventors Joachim LINDNER and Bernhard SCHIERLING, which corresponds to Federal Republic of Germany patent application No. P 44 28 832, filed on Aug. 17, 1994, which corresponds to DE-OS 44 28 832 and DE-PS 44 28 832; U.S. patent application Ser. No. 08/515348 filed on Aug. 15, 1995 entitled "FRICTION CLUTCH FOR THE TRANSMISSION OF A MOTOR VEHICLE & A FLYWHEEL ASSEMBLY FOR A FRICTION CLUTCH", having inventors Joachim LINDNER and Bernhard SCHIERLING, which corresponds to Federal Republic of Germany patent application No. P 44 28 829, filed on Aug. 17, 1994, which corresponds to DE-OS 44 28 829 and DE-PS 44 28 829; U.S. patent application Ser. No. 08/541829 filed on Oct. 10, 1995 entitled "PULLED-TYPE MEMBRANE SPRING CLUTCH WITH WEAR ADJUSTMENT MECHANISM", having inventors Reinhold WEIDINGER and Jorg SUDAU, which corresponds to Federal Republic of Germany patent application No. P 44 36 110, filed on Oct. 10, 1994, which corresponds to DE-08 44 36 110 and DE-PS 44 36 110; and U.S. patent application Ser. No. 08/518789 filed on Aug. 23, 1995 entitled "FRICTION CLUTCH ASSEMBLY FOR A MOTOR VEHICLE, THE FRICTION CLUTCH ASSEMBLY HAVING A CLUTCH PLATE WITH DIVIDED HUB DISC", having inventors Klaus MEMMEL, Jurgen KLEIFGES, Reinhard FELDHAUS, and Harald JEPPE, which corresponds to Federal Republic of Germany patent application No. P 44 29

870, filed on Aug. 23, 1994, which corresponds to DE-OS 44 29 870 and DE-PS 44 29 870. These patents and patent applications, are hereby incorporated by reference as if set forth in their entirety herein. All of the above U.S. patent documents in this paragraph are assigned to Fichtel & Sachs AG of the Federal Republic of Germany.

Examples of clutches, and components thereof, which can possibly be utilized in conjunction with the present invention can be found in the following U.S. Patents: U.S. Pat. No. 5,377,803 which issued to Link et al. on Jan. 3, 1995, entitled "Pressure Plate Arrangement for a Motor vehicle Friction Clutch"; U.S. Pat. No. 5,404,979 which issued to Craft et al. on Apr. 11, 1994, entitled "Motor Vehicle Manual Transmission Modular Clutch Assembly"; U.S. Pat. No. 5,409,091 which issued to Reik et al. on Apr. 25, 1995, entitled "Automatically Adjustable Friction Clutch"; U.S. Pat. No. 4,890,708 which issued to Kitano and Asada on Jan. 2, 1990, entitled "Clutch Having an Adjustable Lever Mating with a Diaphragm Spring"; U.S. Pat. No. 4,903,807 which issued to Kabayama and Takeuchi on Feb. 27, 1990, entitled "Release Bearing Mechanism of a Clutch"; and U.S. Pat. No. 4,951,553 which issued to Kohno on Aug. 28, 1990, entitled "Friction Clutch for Transmission".

Examples of thermally insulative materials which can possibly be utilized with the present invention can be found in the following U.S. Patents: U.S. Pat. No. 5,391,651 which issued to Earls et al. on Feb. 21, 1995, entitled "Curable mixtures of Mesogenic Epoxy Resins and Mesogenic Polyamines and Cured Compositions"; U.S. Pat. No. 5,432,234 which issued to Enomoto et al. on Jul. 11, 1995, entitled "Resin, Process for Preparing the Same and Composition Comprising the Same"; U.S. Pat. No. 4,948,766 which issued to Talmy and Haught on Aug. 14, 1990, entitled "Rigid Mullite-whisker Felt and Method of Preparation"; U.S. Pat. No. 4,943,465 which issued to Bailey et al. on Jul. 24, 1990, entitled "Thermal Insulating, High Temperature Resistant Composite"; U.S. Pat. No. 4,921,894 which issued to Shumate on May 1, 1990, entitled "Novel, High Temperature Resistant Insulation"; U.S. Pat. No. 5,137,789 which issued to Kaushal on Aug. 11, 1992, entitled "Composite Ceramic and Metal Article"; U.S. Pat. No. 5,053,362 which issued to Chi and Halil on Oct. 1, 1991, entitled "Ceramic Fiber Refractory Moldable Compositions"; and U.S. Pat. No. 5,262,477 which issued to Kasai and Ishihara on Nov. 16, 1993, entitled "Polyphenylene Ether Copolymer and Thermoplastic Resin compositions Containing the Same".

Examples of carborane siloxane adhesives and related compositions, which can possibly be used in conjunction with the present invention, may be found in the following U.S. Patents: U.S. Pat. No. 5,208,310 which issued to Dougherty on May 4, 1993, entitled "Method for Preparation of Very High Molecular Weight Polycarborane Siloxanes"; U.S. Pat. No. 5,264,285 which issued to Dougherty on Nov. 23, 1993, entitled "Method of Bonding Using Polycarborane Siloxane Polymers"; U.S. Pat. No. 5,272,237 which issued to Keller and Henderson on Dec. 21, 1993, entitled "Carborane-(Siloxane or Silane)-Unsaturated Hydrocarbon Based Polymers"; and U.S. Pat. No. 5,290,897 which issued to Dougherty on Mar. 1, 1994, entitled "Low Temperature Vulcanizing Carborane Siloxane Adhesive".

Examples of cyanoacrylate adhesives, and related materials, which can be utilized with the present invention, can possibly be found in the following U.S. Patents; U.S. Pat. No. 5,288,794 which issued to Attarwala on Feb. 22, 1994, entitled "Cyanoacrylate Adhesives with Improved Cured Thermal Properties Utilizing Substituted Aromatic Additive"; U.S. Pat. No. 5,306,752 which issued to Attarwala on Apr. 26, 1994, entitled "Cyanoacrylate Adhesives Utilizing Quinoid Compound Polymer Stabilizer"; and U.S. Pat. No. 5,328,944 which issued to Attarwala and Klemarczyk on Jul. 14, 1994, entitled "Cyanoacrylate Adhesives with Improved Cured Thermal Properties".

Various adhesive materials which can be utilized in conjunction with the present invention may be found in the following U.S. Patents: U.S. Pat. No. 4,908,339 which issued to Blount on Mar. 13, 1990, entitled "Flexible Glass"; U.S. Pat. No. 4,933,382 which issued to Kitagawa on Jun. 12, 1990, entitled "Epoxy Resin Powder Coating Composition"; U.S. Pat. No. 5,371,175 which issued to Nojiri and Yabuta on Dec. 6, 1994, entitled "Epoxy-terminated Polyamide, Adhesive Made Therefrom and Methods for Producing Them"; U.S. Pat. No. 5,227,234 which issued to Kauchi et al. on Jul. 13, 1993, entitled "Thermal Adhesive Vibration Damping Sheets"; and U.S. Pat. No. 5,254,387 which issued to Gallucci on Oct. 19, 1993, entitled "High Strength Multi-layered Tape".

Examples of Teflon, forsterite, and materials in composition therewith, which may be utilized in accordance with embodiments of the present invention, can possibly be found in the following U.S. Patents: U.S. Pat. No. 4,902,574 which issued to Lee on Feb. 20, 1990, entitled "Methods of Using Fluoroepoxy Compounds as Adhesives for Fluoroplastic Adherends and Products Made Therefrom"; U.S. Pat. No. 4,985,164 which issued to Delvaux et al. on Jan. 15, 1991, entitled "Forsterite and its Use as Insulating Material"; U.S. Pat. No. 5,313,017 which issued to Aldissi on May 17, 1994, entitled "High-temperature, Light-weight Filter Line Cable"; U.S. Pat. No. 4,876,421 which issued to Miller and Zlupko on Oct. 24, 1989, entitled "Asbestos-free Arc-confining Insulating Structure"; and U.S. Pat. No. 4,883,705 which issued to Kawakami et al. on Nov. 28, 1989, entitled "Composition for Ceramic Substrate and Substrate".

Examples of reinforcing ribs as utilized in clutch assemblies can possibly be found in the following U.S. Patents: U.S. Pat. No. 4,629,048 which issued to Draper et al. on Dec. 16, 1986, entitled "Friction Clutches"; U.S. Pat. No. 4,618,047 which issued to Kinz on Oct. 21, 1986, entitled "Friction Clutch with Pivotable Diaphragm Spring on the Clutch Cover"; U.S. Pat. No. 4,747,586 which issued to Reik on May 31, 1988, entitled "Friction Clutch and Diaphragm Spring Therefor"; and U.S. Pat. No. 4,667,793 which issued to Kunz and Pretzel on May 26, 1987, entitled "Friction Clutch and Diaphragm Spring Therefor".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, are hereby incorporated by reference as if set forth in their entirety herein.

The corresponding foreign patent publication applications, namely, Federal Republic of Germany Patent Application No. 195 11 967.3, filed on Mar. 31, 1995, having inventor Bernhard Schierlinge and DE-OS 195 11

967.3 and DE-PS 195 11 967.3, as well as their published equivalents, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

PARTIAL NOMENCLATURE

| |
|---|
| 1 Means |
| 2 Clutch housing |
| 3 Membrane spring |
| 4 Application plate |
| 5 Insulation |
| 6 Protective device |
| 7 Ring-shaped body |
| 8 Flexible tabs |
| 9 Application edge |

What is claimed is:

1. A friction clutch for a motor vehicle, said friction clutch comprising:

a clutch housing;

a clutch disc;

said clutch disc being configured to be mounted on a transmission input shaft having a longitudinal axis;

said clutch disc being configured to be axially movable along the longitudinal axis of a transmission input shaft;

a pressure plate;

at least one friction lining mounted on said clutch disc;

said at least one friction lining being configured to be disposed between said pressure plate and a flywheel;

said pressure plate being configured and disposed to engage and disengage said clutch disc with a flywheel;

said pressure plate being configured and disposed to be axially movable along the longitudinal axis of a transmission input shaft;

a membrane spring;

said membrane spring being disposed between said clutch housing and said pressure plate;

said membrane spring being configured and disposed to bias said pressure plate;

a thermal insulating member being configured to minimize heat conduction from said pressure plate to said membrane spring;

said insulating member being disposed between said pressure plate and said membrane spring;

said insulating member being rigid;

said insulating member comprising a first surface and a second surface;

said first surface of said insulating member being disposed to contact said membrane spring;

said second surface of said insulating member being disposed to contact said pressure plate;

said insulating member comprising a metal;

said metal of said insulating member being configured to minimize heat conduction from said pressure plate to said membrane spring to minimize distortion of said membrane spring from thermal conduction of heat from said pressure plate to said membrane spring;

said membrane spring comprising a first material;

said first material having a first resistance to thermal conductivity;

said pressure plate comprising a second material;

said second material having a second resistance to thermal conductivity;

said metal of said insulating member having a third resistance to thermal conductivity;

the third resistance to thermal conductivity being substantially greater than at least one of: the first resistance to thermal conductivity and the second resistance to thermal conductivity;

an arrangement to further minimize heat conduction from said pressure plate to said membrane spring;

said arrangement to further minimize heat conduction comprising the following set of characteristics:

said metal of said insulating member representing a first insulating material;

said insulating member comprising a metal portion and an additional portion;

said metal portion of said insulating member comprising said metal of said insulating member;

said additional portion of said insulating member being configured to further minimize heat conduction from said pressure plate to said membrane spring to minimize distortion of said membrane spring from thermal conduction of heat from said pressure plate to said membrane spring; and said additional portion of said insulating member comprising a second insulating material;

said second insulating material comprising plastic; and said plastic being substantially heat resistant.

2. A friction clutch for a motor vehicle, said friction clutch comprising:

a clutch housing;

a clutch disc;

said clutch disc being configured to be mounted on a transmission input shaft having a longitudinal axis;

said clutch disc being configured to be axially movable along the longitudinal axis of a transmission input shaft;

a pressure plate;

at least one friction lining mounted on said clutch disc;

said at least one friction lining being configured to be disposed between said pressure plate and a flywheel;

said pressure plate being configured and disposed to engage and disengage said clutch disc with a flywheel;

said pressure plate being configured and disposed to be axially movable along the longitudinal axis of a transmission input shaft;

a membrane spring;

said membrane spring being disposed between said clutch housing and said pressure plate;

said membrane spring being configured and disposed to bias said pressure plate;

said pressure plate comprising a first portion and a second portion;

said first portion of said pressure plate being disposed to contact said clutch disc;

said second portion of said pressure plate being disposed away from said clutch disc;

a thermal insulating member being configured to minimize heat conduction from said pressure plate to said membrane spring;

said insulating member being disposed between said membrane spring and said first portion of said pressure plate;

one of said insulating member and said second portion of said pressure plate being disposed to contact said membrane spring;

said insulating member being rigid;

said insulating member comprising a metal;

said metal of said insulating member being configured to minimize heat conduction from said first portion of said pressure plate to said membrane spring to minimize distortion of said membrane spring from thermal conduction of heat from said pressure plate to said membrane spring;

said membrane spring comprising a first material;

said first material having a first resistance to thermal conductivity;

said pressure plate comprising a second material;

said second material having a second resistance to thermal conductivity;

said metal of said insulating member having a third resistance to thermal conductivity;

the third resistance to thermal conductivity being substantially greater than at least one of: the first resistance to thermal conductivity and the second resistance to thermal conductivity;

each of said membrane spring and said pressure plate being configured to rotate about an axis of rotation;

said membrane spring comprising an inner portion and an outer portion;

said outer portion of said membrane spring being disposed radially farther from the axis of rotation of said membrane spring than said inner portion of said membrane spring;

said second portion of said pressure plate comprising an inner portion and an outer portion;

said outer portion of said second portion of said pressure plate being disposed radially farther from the axis of rotation of said pressure plate than said inner portion of said second portion of said pressure plate;

said insulating member being disposed adjacent one of said outer portion of said membrane spring and said outer portion of said second portion of said pressure plate;

said insulating member being disposed to extend circumferentially along at least a portion of said one of said outer portion of said membrane spring and said outer portion of said second portion of said pressure plate;

a device to protect said membrane spring from conduction of heat from said pressure plate to said membrane spring;

said protective device comprising said insulating member;

said insulating member having an annular shape enclosing the axis of rotation;

said protective device being disposed to adhere to said outer portion of said second portion of said pressure plate;

said metal of said insulating member being a first insulating material;

said insulating member being disposed between said membrane spring and said second portion of said pressure plate;

said insulating member comprising a metal portion and at least one additional portion;

said metal portion comprising said metal of said insulating member;

said at least one additional portion of said insulating member comprising a second insulating material; and said at least one additional portion of said insulating member being disposed to contact said membrane spring.

3. A friction clutch for a motor vehicle, said friction clutch comprising:

a clutch housing;

a clutch disc;

said clutch disc being configured to be mounted on a transmission input shaft having a longitudinal axis;

said clutch disc being configured to be axially movable along the longitudinal axis of a transmission input shaft;

a pressure plate;

at least one friction lining mounted on said clutch disc;

said at least one friction lining being configured to be disposed between said pressure plate and a flywheel;

said pressure plate being configured and disposed to engage and disengage said clutch disc with a flywheel;

said pressure plate being configured and disposed to be axially movable along the longitudinal axis of a transmission input shaft;

a membrane spring;

said membrane spring being disposed between said clutch housing and said pressure plate;

said membrane spring being configured and disposed to bias said pressure plate;

said pressure plate comprising a first portion and a second portion;

said first portion of said pressure plate being disposed to contact said clutch disc;

said second portion of said pressure plate being disposed away from said clutch disc;

a thermal insulating member being configured to minimize heat conduction from said pressure plate to said membrane spring;

said insulating member being disposed between said membrane spring and said first portion of said pressure plate;

one of said insulating member and said second portion of said pressure plate being disposed to contact said membrane spring;

said insulating member being rigid;

said insulating member comprising a metal;

said metal of said insulating member being configured to minimize heat conduction from said first portion of said pressure plate to said membrane spring to minimize distortion of said membrane spring from thermal conduction of heat from said pressure plate to said membrane spring;

said membrane spring comprising a first material;

said first material having a first resistance to thermal conductivity;

said pressure plate comprising a second material;

said second material having a second resistance to thermal conductivity;

said metal of said insulating member having a third resistance to thermal conductivity;

the third resistance to thermal conductivity being substantially greater than at least one of: the first resistance to thermal conductivity and the second resistance to thermal conductivity;

an arrangement to further minimize heat conduction from said pressure plate to said membrane spring;

said arrangement to further minimize heat conduction comprising the following set of characteristics:

said metal of said insulating member representing a first insulating material;

said insulating member comprising a metal portion and an additional portion;

said metal portion of said insulating member comprising said metal of said insulating member;

said additional portion of said insulating member being configured to further minimize heat conduction from said pressure plate to said membrane spring to minimize distortion of said membrane spring from thermal conduction of heat from said pressure plate to said membrane spring; and said additional portion of said insulating member comprising a second insulating material;

said second insulating material comprising plastic; and said plastic being substantially heat resistant.

4. A friction clutch for a motor vehicle, said friction clutch comprising:

a clutch housing;

a clutch disc;

said clutch disc being configured to be mounted on a transmission input shaft having a longitudinal axis;

said clutch disc being configured to be axially movable along the longitudinal axis of a transmission input shaft;

a pressure plate;

at least one friction lining mounted on said clutch disc;

said at least one friction lining being configured to be disposed between said pressure plate and a flywheel;

said pressure plate being configured and disposed to engage and disengage said clutch disc with a flywheel;

said pressure plate being configured and disposed to be axially movable along the longitudinal axis of a transmission input shaft;

a membrane spring;

said membrane spring being disposed between said clutch housing and said pressure plate;

said membrane spring being configured and disposed to bias said pressure plate;

said pressure plate comprising a first portion and a second portion;

said first portion of said pressure plate being disposed to contact said clutch disc;

said second portion of said pressure plate being disposed away from said clutch disc;

a thermal insulating member being configured to minimize heat conduction from said pressure plate to said membrane spring;

said insulating member being disposed between said membrane spring and said first portion of said pressure plate;

one of said insulating member and said second portion of said pressure plate being disposed to contact said membrane spring;

said insulating member being rigid;

said insulating member being configured to minimize heat conduction from said first portion of said pressure plate to said membrane spring to minimize distortion of said membrane spring from thermal conduction of heat from said pressure plate to said membrane spring;

said pressure plate being a unitary one-piece component of said friction clutch;

said membrane spring comprising a first material;

said first material having a first resistance to thermal conductivity;

said pressure plate comprising a second material;

said second material having a second resistance to thermal conductivity;

said insulating member comprising a third material;

said third material having a third resistance to thermal conductivity;

the third resistance to thermal conductivity being substantially greater than at least one of: the first resistance to thermal conductivity and the second resistance to thermal conductivity;

said third material of said insulating member comprising metal;

an arrangement to further minimize heat conduction from said pressure plate to said membrane spring;

said arrangement to further minimize heat conduction comprising the following set of characteristics:

said metal of said insulating member representing a first insulating material;

said insulating member comprising a metal portion and an additional portion;

said metal portion of said insulating member comprising said metal of said insulating member; and said additional portion of said insulating member comprising a second insulating material;

said second insulating material comprising plastic; and said plastic being substantially heat resistant.

* * * * *

UNITED STATES PATENT AND TRADEMARK OFFICE
CERTIFICATE OF CORRECTION

PATENT NO.  : 5,765,674
DATED       : June 16, 1998
INVENTOR(S) : Bernhard SCHIERLING It is certified that error appears in the above-identified patent and that said Letters Patent is hereby corrected as shown below:

On the title page, item [56], under the U.S. PATENT DOCUMENTS section, add the following reference:

--1,886,193   11/1932   Jones--.

In column 6, line 8, after 'to', delete "DG-05" and insert DE-0S--.

In column 6, line 14, after 'Gunter', delete "WAWRZXK," and insert --WAWRZIK,--.

In column 6, line 23, after 'Reinhard', delete "FELDEAUS," and insert --FELDHAUS,--.

In column 6, line 59, after 'to', delete "DE-08" and insert --DE-0S--.

In column 8, line 67, after 'Bernhard', delete "Schierlinge" and insert --Schierling,--.

Signed and Sealed this

Twenty-seventh Day of April, 1999

*Attest:*

Q. TODD DICKINSON

*Attesting Officer*      *Acting Commissioner of Patents and Trademarks*